United States Patent
Mitchell et al.

(10) Patent No.: US 8,519,866 B2
(45) Date of Patent: Aug. 27, 2013

(54) WIRELESS TELEMETRY FOR INSTRUMENTED COMPONENT

(75) Inventors: David J. Mitchell, Oviedo, FL (US); Anand A. Kulkarni, Oviedo, FL (US); Ramesh Subramanian, Oviedo, FL (US); Edward R. Roesch, Orlando, FL (US); Rod Waits, Sunnyvale, CA (US); John R. Fraley, Fayetteville, AR (US); Roberto M. Schupbach, Fayetteville, AR (US); Alexander B. Lostetter, Fayetteville, AR (US)

(73) Assignee: Siemens Energy, Inc., Orlando, FL (US)

( * ) Notice: Subject to any disclaimer, the term of this patent is extended or adjusted under 35 U.S.C. 154(b) by 1692 days.

(21) Appl. No.: 11/936,936

(22) Filed: Nov. 8, 2007

(65) Prior Publication Data

US 2009/0121896 A1    May 14, 2009

(51) Int. Cl.
*G08C 19/16*    (2006.01)

(52) U.S. Cl.
USPC ............... 340/870.01; 340/870.07; 374/141; 374/179; 702/117; 702/130; 73/754

(58) Field of Classification Search
USPC .............. 340/870.01, 870.07; 374/141, 179; 702/117, 130; 73/754
See application file for complete search history.

(56) References Cited

U.S. PATENT DOCUMENTS

| | | |
|---|---|---|
| 3,876,998 A | 4/1975 | Richter et al. |
| 3,890,456 A | 6/1975 | Dils |
| 4,339,719 A | 7/1982 | Rhines et al. |
| 4,546,652 A | 10/1985 | Virkar et al. |
| 4,578,992 A | 4/1986 | Galasko et al. |
| 4,595,298 A | 6/1986 | Frederick |
| 4,703,326 A | 10/1987 | Ding et al. |
| 4,812,050 A | 3/1989 | Epstein |
| 4,851,300 A | 7/1989 | Przybyszewski |
| 4,860,442 A | 8/1989 | Ainsworth et al. |
| 4,916,715 A | 4/1990 | Adiutori |
| 4,969,956 A | 11/1990 | Kreider et al. |
| 4,970,670 A | 11/1990 | Twerdochlib |

(Continued)

OTHER PUBLICATIONS

P. Gramatyka, R. Nowosielski, P. Sakiewicz, T. Raszka; "Soft magnetic composite based on nanocrystalline Fe73.5Cu1Nb3Si13.5B9 and Fe Powders"; Journal of Achievements in Materials and Manufacturing Engineering; Mar.-Apr. 2006; pp. 27-31; vol. 15, Issue 1-2; XP-002538559.

*Primary Examiner* — Hai Phan
*Assistant Examiner* — Amine Benlagsir

(57) ABSTRACT

A telemetry system for use in a combustion turbine engine (10) having a compressor (12), a combustor and a turbine (16) that includes a sensor (50, 74) in connection with a turbine blade (18) or vane (22). A telemetry transmitter circuit (210) may be affixed to the turbine blade (18) with a first connecting material (52, 152) deposited on the turbine blade (18) for routing electronic data signals from the sensor (50, 74) to the telemetry transmitter circuit (210), the electronic data signals indicative of a condition of the turbine blade (18). An induction power system for powering the telemetry transmitter circuit (210) may include a rotating data antenna (202) affixed to the turbine blade (18) with a second connecting material (140) deposited on the turbine blade (18) for routing electronic data signals from the telemetry transmitter circuit (210) to the rotating data antenna (202). A stationary data antenna (184) may be affixed to a static seal segment 180 adjacent the turbine blade (18) for receiving electronic data signals from the rotating data antenna (202).

19 Claims, 8 Drawing Sheets

(56) References Cited

U.S. PATENT DOCUMENTS

| | | | |
|---|---|---|---|
| 4,983,034 A | 1/1991 | Spillman, Jr. | |
| 5,005,353 A | 4/1991 | Acton et al. | |
| 5,144,299 A * | 9/1992 | Smith | 340/870.18 |
| 5,197,337 A * | 3/1993 | Glasheen | 73/861.78 |
| 5,268,006 A * | 12/1993 | Ueno et al. | 29/25.03 |
| 5,306,368 A | 4/1994 | Yamada et al. | |
| 5,318,725 A | 6/1994 | Sandhage | |
| 5,350,279 A * | 9/1994 | Prentice et al. | 416/220 R |
| 5,440,300 A | 8/1995 | Spillman, Jr. | |
| 5,578,877 A | 11/1996 | Tiemann | |
| 5,952,836 A | 9/1999 | Haake | |
| 5,956,073 A * | 9/1999 | Jin et al. | 725/105 |
| 5,969,260 A | 10/1999 | Belk et al. | |
| 5,970,393 A | 10/1999 | Khorrami et al. | |
| 6,000,977 A | 12/1999 | Haake | |
| 6,034,296 A | 3/2000 | Elvin et al. | |
| 6,072,165 A | 6/2000 | Feldman | |
| 6,109,783 A | 8/2000 | Dobler et al. | |
| 6,127,040 A | 10/2000 | Grobbauer et al. | |
| 6,142,665 A | 11/2000 | Haffner et al. | |
| 6,197,424 B1 | 3/2001 | Morrison et al. | |
| 6,262,550 B1 | 7/2001 | Kliman et al. | |
| 6,280,083 B2 | 8/2001 | Kita et al. | |
| 6,331,823 B1 | 12/2001 | El-Ibiary | |
| 6,343,251 B1 | 1/2002 | Herron et al. | |
| 6,398,503 B1 | 6/2002 | Takahashi et al. | |
| 6,437,681 B1 | 8/2002 | Wang et al. | |
| 6,512,379 B2 | 1/2003 | Harrold et al. | |
| 6,523,383 B2 | 2/2003 | Joki et al. | |
| 6,532,412 B2 | 3/2003 | Adibhatla et al. | |
| 6,556,956 B1 | 4/2003 | Hunt | |
| 6,576,861 B2 | 6/2003 | Sampath et al. | |
| 6,591,182 B1 | 7/2003 | Cece et al. | |
| 6,667,725 B1 | 12/2003 | Simons et al. | |
| 6,677,683 B2 | 1/2004 | Klausing et al. | |
| 6,729,187 B1 | 5/2004 | Gregory | |
| 6,735,549 B2 | 5/2004 | Ridolfo | |
| 6,756,131 B2 | 6/2004 | Oguma et al. | |
| 6,756,908 B2 | 6/2004 | Gass et al. | |
| 6,760,689 B2 | 7/2004 | Follin et al. | |
| 6,796,187 B2 | 9/2004 | Srinivasan et al. | |
| 6,808,813 B2 | 10/2004 | Kimura et al. | |
| 6,816,817 B1 | 11/2004 | Retlich et al. | |
| 6,831,555 B1 | 12/2004 | Miller et al. | |
| 6,838,157 B2 | 1/2005 | Subramanian | |
| 6,979,498 B2 | 12/2005 | Darolia et al. | |
| 6,979,991 B2 | 12/2005 | Burns et al. | |
| 7,004,622 B2 | 2/2006 | Hardwicke et al. | |
| 7,009,310 B2 | 3/2006 | Cheung et al. | |
| 7,208,230 B2 * | 4/2007 | Ackerman et al. | 428/469 |
| 7,572,524 B2 * | 8/2009 | Sabol et al. | 428/701 |
| 7,908,014 B2 * | 3/2011 | Schulman et al. | 607/61 |
| 8,011,255 B2 * | 9/2011 | Arms et al. | 73/862.325 |
| 2002/0068488 A1 * | 6/2002 | Tuller et al. | 439/775 |
| 2002/0083712 A1 | 7/2002 | Tomlinson et al. | |
| 2002/0143477 A1 | 10/2002 | Antoine et al. | |
| 2003/0020480 A1 | 1/2003 | Maylotte et al. | |
| 2003/0049119 A1 | 3/2003 | Johnson | |
| 2004/0101022 A1 * | 5/2004 | Hardwicke et al. | 374/141 |
| 2004/0114666 A1 | 6/2004 | Hardwicke et al. | |
| 2005/0061058 A1 | 3/2005 | Willsch et al. | |
| 2005/0287386 A1 * | 12/2005 | Sabol et al. | 428/543 |
| 2006/0018361 A1 | 1/2006 | Hardwicke et al. | |
| 2006/0020415 A1 | 1/2006 | Hardwicke et al. | |
| 2007/0071607 A1 * | 3/2007 | Esser | 416/241 R |
| 2008/0063514 A1 * | 3/2008 | Durocher et al. | 415/138 |

* cited by examiner

US 8,519,866 B2

WIRELESS TELEMETRY FOR INSTRUMENTED COMPONENT

STATEMENT OF GOVERNMENT INTEREST

The Government of the United States of America has certain rights in this invention pursuant to Contract No. 70NANB4H3042, awarded by the U.S. Department of Commerce, National Institute of Standards and Technology.

FIELD OF THE INVENTION

The present invention relates generally to monitoring operating environments and in particular to instrumented components and telemetry systems enabled for wirelessly transmitting electronic data indicative of individual component condition within an operating environment such as that of a combustion turbine engine.

SUMMARY OF THE INVENTION

Embodiments of the present invention provide high temperature wireless telemetry systems configured for operation on rotating or stationary components within an operating environment having an operating temperature of approximately 450° C. or greater, such as within certain sections of a combustion turbine engine.

An exemplary high temperature telemetry system for use in a combustion turbine engine may include at least one sensor deposited on a component such as a turbine blade. A telemetry transmitter circuit may be affixed to the turbine blade and a connecting material may be deposited on the turbine blade for routing electronic data signals from the sensor to the telemetry transmitter circuit, the electronic data signals indicative of a condition of the turbine blade. An induction power system is provided for powering the telemetry transmitter circuit with a rotating data antenna affixed to the component, such as the turbine blade; and a stationary data antenna affixed to a static seal segment adjacent to the turbine blade.

DETAILED DESCRIPTION OF THE INVENTION

Figure 1:
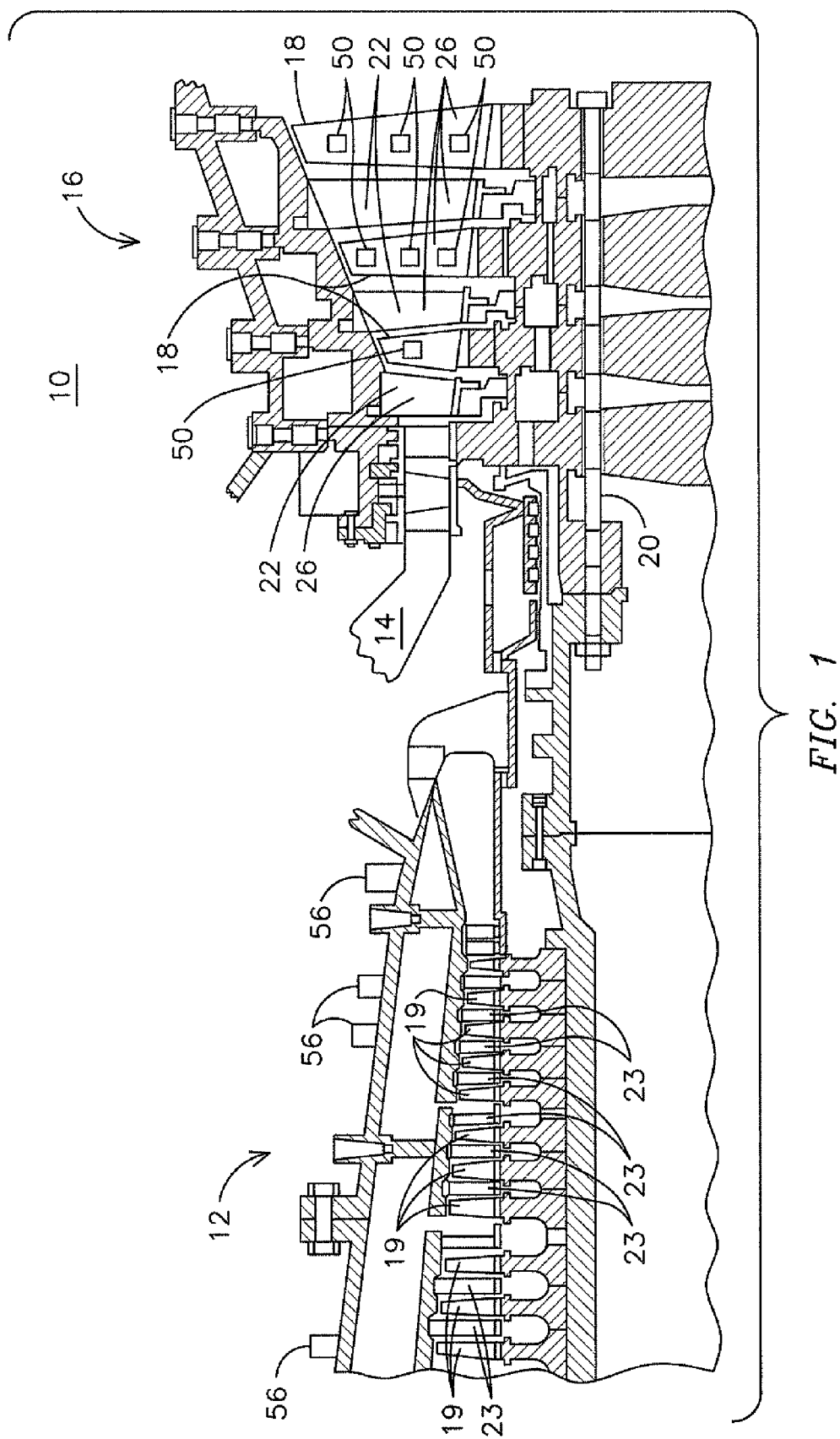
FIG. 1 is a cross sectional view of an exemplary combustion turbine.

FIG. 1 illustrates an exemplary combustion turbine 10 such as a gas turbine used for generating electricity. Embodiments of the invention may be used with combustion turbine 10 or in numerous other operating environments and for various purposes. Combustion turbine 10 includes a compressor 12, at least one combustor 14 (broken away) and a turbine 16. Compressor 12, combustor 14 and turbine 16 are sometimes referred to collectively as a gas or combustion turbine engine 10. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-based alloys, and may be coated with a thermal barrier coating ("TBC") 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas temperature will typically be above about 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment within which turbine blades 18 and vanes 22 operate is particularly harsh, subject to high operating temperatures and a corrosive atmosphere, which may result in serious deterioration of blades 18 and vanes 22. This is especially likely if TBC 26 should spall or otherwise deteriorate. Embodiments of the invention are advantageous because components may transmit real time or near real time data indicative of a component's condition during operation of combustion turbine 10.

U.S. Pat. No. 6,576,861, the disclosure of which is specifically incorporated herein by reference, discloses a method and apparatus that may be used to deposit embodiments of sensors and connectors for connecting sensors with transmitters or otherwise routing data signals. In this respect, methods and apparatus disclosed therein may be used for the patterning of fine sensor and/or connector features of between about 100 microns and 500 microns without the need of using masks. Multilayer electrical circuits and sensors may be formed by depositing features using conductive materials, resistive materials, dielectric materials, insulative materials and other application specific materials. Alternate methods may be used to deposit multilayer electrical circuits, sensors and connectors such as thermal spraying, vapor deposition, laser sintering and curing deposits of material sprayed at lower temperatures may be used as well as other suitable techniques.

Figure 2:
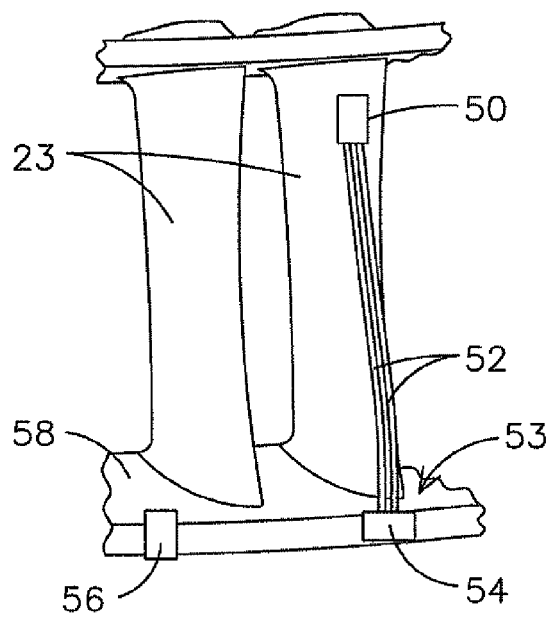
FIG. 2 is a perspective view of an exemplary combustion turbine vane.

FIG. 2 illustrates a pair of adjacent vanes 23 removed from compressor 12 with one vane 23 having a sensor 50 mounted or connected thereto for detecting a condition of the vane. A lead line or connector 52 may be deposited as a means for routing a data signal from sensor 50 to a transmitter 54 configured for wirelessly transmitting the data signal to a transceiver 56. Connector 52 may be one or a plurality of electrical leads for conducting a signal from sensor 50 to transmitter 54. Alternate embodiments allow for various types of connectors 52 to be used as a means for routing a data signal from sensor 50 to transmitter 54, depending on the specific application.

Transmitters 54 may be multi-channel and have various specifications depending on their location within a casing of combustion turbine 10. Transmitters 54 may be configured to function within the early stages of compressor 12, which are subject to operating temperatures of between about 80° C. to 120° C. Transmitters 54 may be configured to function within later stages of compressor 12 and/or stages of turbine 16 subject to operating temperatures of greater than about 120° C. and up to about 300° C. Transmitters 54 may be fabricated using silicon-on-insulator (SOI) technology and other materials capable of operating in regions with temperatures greater than about 120° C.

Figure 3:
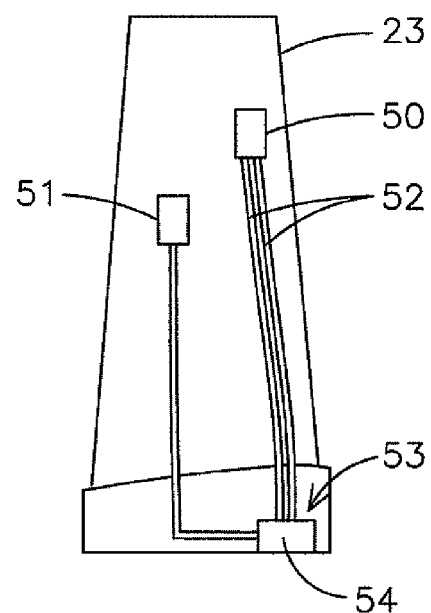
FIG. 3 is a side view of the vane of FIG. 2.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54.

One or more sensors 50 may be connected with one or more compressor vanes 23 by fabricating or depositing sensors 50 and connectors 52 directly onto a surface of vane 23. Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23. Embodiments allow for a distal end 53 of connectors 52 to be exposed at a termination location, which may be proximate a peripheral edge of a component or other suitable location. This allows a field technician to quickly and easily connect connector 52 to a transmitter 54 regardless of its location.

Figure 4:
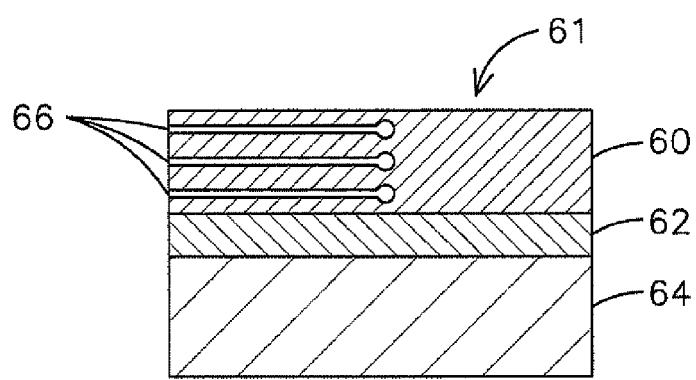
FIG. 4 is an exemplary heat flux sensor deposited on a substrate.

FIG. 4 illustrates an exemplary sensor 61 that may be deposited within a barrier coating such as TBC 60, which may be yttria-stabilized zirconia. TBC 60 may be deposited on a bond coat 62, which may be deposited on a substrate 64. Substrate 64 may be various components such as a superalloy suitable for use in turbine 16 such as a turbine blade 18. Sensor 61 may be formed for various purposes and may include thermocouples 66 deposited using conventional K, N, S, B and R-type thermocouple material, or any combination of their respective constituent elements provided that the combination generates an acceptable thermoelectric voltage for a particular application within combustion turbine 10.

Type K thermocouple materials NiCr or NiAl may be used in sections of compressor 12 having an operating environment up to approximately 800° C. For example, NiCr(20) may be used to deposit a strain gage in compressor 12. Type N thermocouple material, such as alloys of NiCrSi and NiSi, for example, may be used for depositing sensors in sections of turbine 16 having an operating environment between approximately 800° C. to 1150° C.

Type S, B and R thermocouple materials may be used for depositing sensors in sections of turbine 16 having an operating environment between approximately 1150° C. to 1350° C. For example, Pt—Rh, Pt—Rh(10) and Pt—Rh(13) may be deposited to form sensors 50 within turbine 16 provided that the material generates an acceptable thermoelectric voltage for a particular application within combustion turbine 10. Ni alloys, for example NiCr, NiCrSi, NiSi and other oxidation-resistant Ni-based alloys such as MCrAlX, where M may be Fe, Ni or Co, and X may be Y, Ta, Si, Hf, Ti, and combinations thereof, may be used as sensing materials for high temperature applications in deeper sections of compressor 12 and throughout turbine 16. These alloys may be used as sensing material deposited in various sensing configurations to form sensors such as heat flux sensors, strain sensors and wear sensors.

Figure 5:
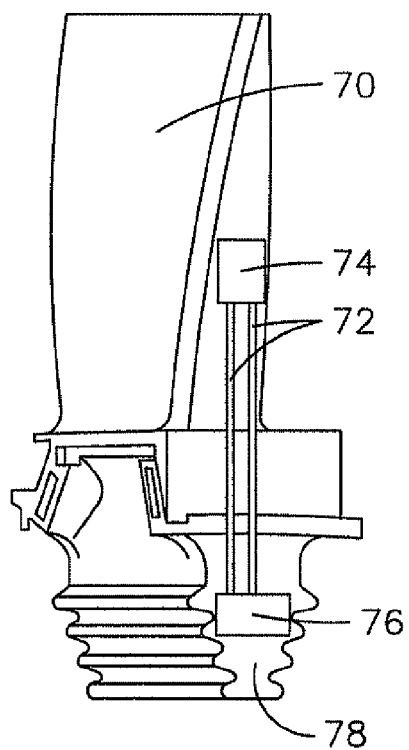
FIG. 5 is a perspective view of an exemplary turbine blade, sensor and wireless telemetry device.

Components within combustion turbine 10, such as blades 18, 19 and/or vanes 22, 23 may have application specific sensors 50 deposited to conform to a component's surface and/or embedded within a barrier or other coating deposited within combustion turbine 10. For example, FIG. 5 shows an exemplary turbine blade 70, which may be a blade from row 1 of turbine 16, having high temperature resistant lead wires, such as connectors 72 deposited to connect an embedded or surface mounted sensor 74 with a wireless telemetry device 76. Device 76 may be mounted in a location where the telemetry components are exposed to relatively lower temperatures, such as proximate the root 78 of blade 70 where the operating temperature is typically about 150° C.-250° C. and higher.

Silicon-based electronic semiconductors, such as those that may be used for transmitting data may have limited applications due to their operational temperature constraints. Temperature and performance properties of silicon and silicon-on-insulator (SOI) electronic chip technologies may limit their applications to operating environments of less than about 200° C. Aspects of the invention allow for such electronic systems to be deployed for wireless telemetry device 76 within compressor 12, which typically has an operating temperature of about 100-150° C.

Embodiments of wireless telemetry sensor systems may be configured to operate within higher temperature regions present in later stages of compressor 12, and within turbine 16. These regions may have operating temperatures of about 150-250° C. and higher. Materials having temperature and electrical properties capable of operation in these higher temperature regions may be used for depositing sensors 50, 74, connectors 52, 72 and fabricating wireless telemetry devices 76.

Sensors 50, 74 and high temperature interconnect lines or connectors 52, 72 may be deposited using known deposition processes such as plasma spraying, EB PVD, CVD, pulsed laser deposition, mini-plasma, direct-write, mini-HVOF or solution plasma spraying. Typically, dynamic pressure measurements, dynamic and static strain, and dynamic acceleration measurements are desired on both stationary and rotating components of combustion turbine 10 together with component surface temperature and heat flux measurements. Thus, embedded or surface mounted sensors 50, 74 may be configured as strain gages, thermocouples, heat-flux sensors, pressure transducers, micro-accelerometers as well as other desired sensors.

Figure 6:
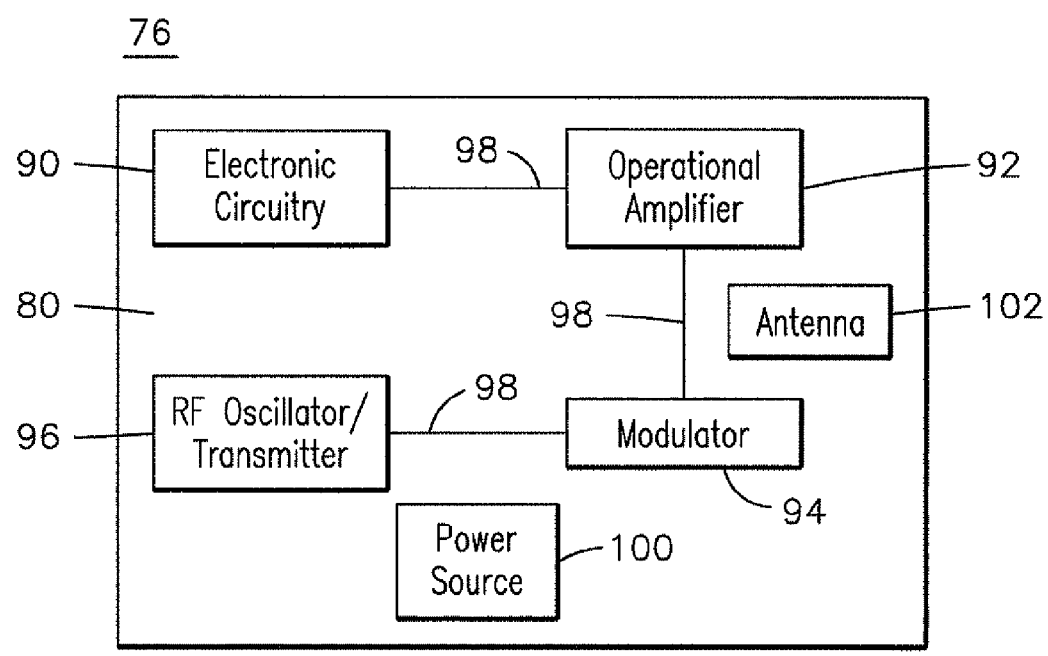
FIG. 6 is a schematic of an exemplary wireless telemetry device.

FIG. 6 is a schematic of a representative embodiment of a wireless telemetry device 76. Device 76 may be formed as a circuit board or integrated chip that includes a plurality of electronic components such as resistors, capacitors, inductors, transistors, transducers, modulators, oscillators, transmitters, amplifiers, and diodes either embossed, surface mounted or otherwise deposited thereon with or without an integral antenna and/or power source. Embodiments of wireless telemetry device 76 may be fabricated for use in compressor 12 and/or turbine 16.

Wireless telemetry device 76 may include a board 80, an electronic circuit 90, an operational amplifier 92, a modulator 94 and an RF oscillator/transmitter 96 electrically connected with each other via interconnects 98. The embodiment of FIG. 6 is an exemplary embodiment and other embodiments of device 76 are contemplated depending on performance specifications and operating environments. Embodiments of device 76 allow for a power source 100, and a transmitting and receiving antenna 102 to be fabricated on board 80 thereby forming a transmitter such as transmitter 54 shown in FIGS. 2 & 3, or wireless telemetry device 76, shown in FIG. 5.

Figure 7:
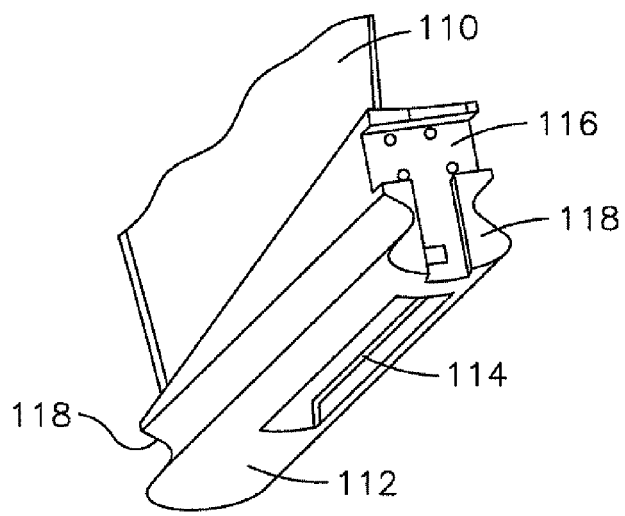
FIG. 7 is a partial perspective view of an exemplary compressor blade.

FIG. 7 illustrates a partial perspective view of an exemplary blade, such as a blade 110 having a blade root 112, which may be a compressor blade within compressor 12. One or more recesses or trenches 114 may be formed within root 112 such as within the bottom of blade root 112. Recesses 114 may be formed in various shapes or dimensions and located within blade root 112 at various places along its length. One or more recesses or trenches 116 may be formed in one or more faces 118 of blade root 112. Recesses 116 may be formed in various shapes or dimensions and located within blade root 112 at various places within a face 118. Recesses 114, 116 may be formed using various methods such as by milling them out after blade 110 is cast or by forming them as part of the blade 110 mold.

Figure 8:
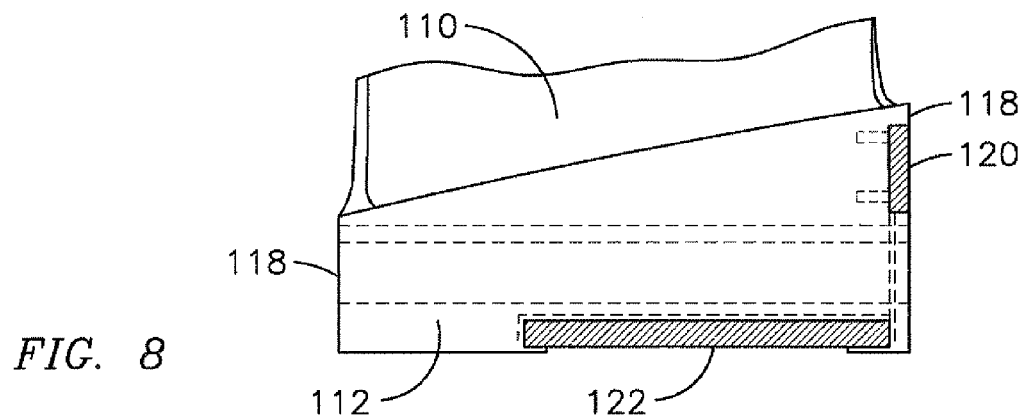
FIG. 8 is a partial side view of the exemplary compressor blade of FIG. 7.

FIG. 8 illustrates compressor blade 110 instrumented with components of wireless telemetry device 76 affixed within blade root 112. In this respect, alternate embodiments of wireless telemetry device 76 allow for one or more electrical components 90, 92, 94, 96, 100, 102, shown in FIG. 6, to be mounted separately or contained on discrete boards 80 that are electrically connected and affixed with an instrumented component such as blade root 112. For example, a transmitting and receiving antenna 102 shown in FIG. 6 may be mounted separately from and electrically connected with board 80 having a transmitter 122 formed thereon and being electrically connected with antenna 102.

Antenna 120 may be seated within recess 116 and transmitter 122 may be seated within recess 114. In this aspect, antenna 120 and transmitter 122 are not mounted/embossed or deposited onto a board 80. In other embodiments, antenna 120 may be deposited on a wireless telemetry board 80, as shown in FIG. 6, and the data may be transmitted using wireless telemetry to a receiver such as a stationary mounted transceiver 56. Power source 100 may be integral with board 80 or located separately from the board and mounted as a discrete component.

Figure 9:
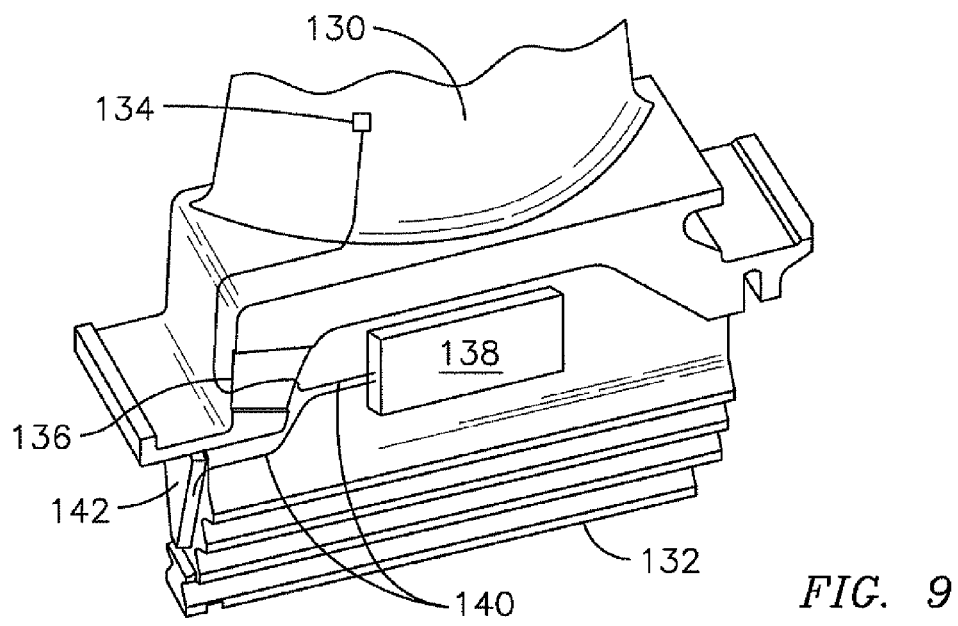
FIG. 9 is a partial cross sectional view of the exemplary turbine blade of FIG. 5.

FIG. 9 illustrates a partial view of an exemplary blade 130, which may be a turbine blade such as one of the turbine blades 18. Turbine blade 130 includes a root portion 132 defining an outer mold line for mating with a rotor disk of turbine 16 within which blade 130 may be secured for operation of combustion turbine 10. Sensing material may be deposited on blade 130 or within a barrier coating deposited on the blade's surface to form a sensor 134. Connecting material may be deposited to form connectors 140 so that data signals from sensor 134 may be communicated to a transmitter 138 and subsequently to a rotating antenna assembly 142. A recess 136 may be formed within a portion of blade 130 so that one or more connectors 140 are seated below an outer surface of blade 130.

Transmitter 138 and antenna assembly 142 may be integrally secured with blade 130 so that the outer mold line defined by root 132 is not altered. For example, transmitter 138 may be affixed to a transition area, or platform, above the fir tree portion of root 132 and antenna assembly 142 may be affixed to a face of root 132. Alternately, recesses may be formed within the platform and face so that all or a portion of transmitter 138 and/or antenna assembly 142 are seated below the surface of the outer mold line of blade root 172. Transmitter 138 and antenna assembly 142 may be secured within respective recesses using an epoxy or adhesive and a backfill material may be place over them for protection from high temperatures or particulates.

With respect to FIG. 5, wireless telemetry device 76 may be affixed to blade root 78 externally or embedded in such a way so that an outer mold line of the blade root is not significantly altered. Device 76 may be affixed proximate blade root 78 so that it is contained within a cavity that is created between the blade root 78 and a rotor disk of turbine 16 when blade root 78 is inserted within the rotor disk. This enables a turbine blade 70 instrumented with sensor 74, connectors 72 and device 76 to be installed into a mating segment of a rotor disk of turbine 16 in the same manner as a turbine blade that is not instrumented. In this respect, instrumented blade 70 may be manufactured having all components necessary for wirelessly extracting data indicative of various operating parameters or conditions of blade 70 and/or a barrier coating deposited thereon and transmitting that data to a receiving device.

For example, one or more recesses or trenches may be formed into a portion of the substrate of blade 70, such as blade root 78, within which one or more wireless telemetry devices 76 may be contained. Trenches may be formed by milling out desired regions of blade root 78 and securing device 76 within the trench with an epoxy or other suitable binder. The trenches may be back filled with a suitably high temperature cement or ceramic paste to protect device 76.

Embodiments of the present invention allow for transmitting sensor data from a rotating component, such as a turbine engine blade 130 having certain electronic components located on root 132 of the blade, which operates in an environment having a temperature of between about 300-500° C. For purposes of the disclosure herein, the term "high temperature" without additional qualification will refer to any operating environment, such as that within portions of combustion turbine 10, having a maximum operating temperature of between about 300-500° C.

Figure 10:
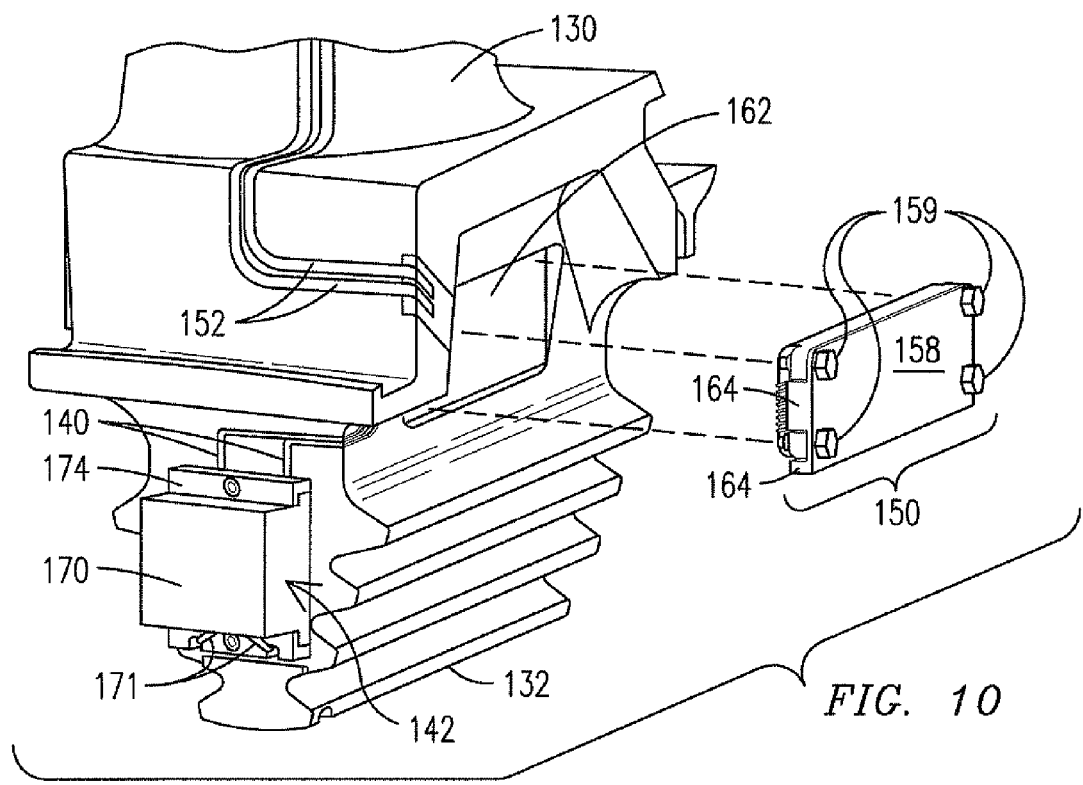
FIG. 10 is a perspective view of the exemplary turbine blade of FIG. 9, an exploded view of a telemetry transmitter housing and an exemplary rotating antenna assembly mounted to the turbine blade.

Embodiments of the present invention provide components for use in combustion turbine 10 instrumented with telemetry systems that may include one or more sensors, lead lines connecting sensors with at least one telemetry transmitter circuit, at least one transmitting antenna, a power source and at least one receiving antenna. FIG. 10 illustrates turbine blade 130, a wireless telemetry transmitter assembly 150 and rotating antenna assembly 142. Lead lines or connectors 152 may extend from one or more sensors, such as sensors 70, 134 to telemetry transmitter assembly 150 when mounted proximate blade root 132. Lead lines 152 may route electronic data signals from sensor 70, 134 to telemetry transmitter assembly 150 where the signals are processed by a telemetry transmitter circuit formed on a circuit board contained within an electronics package 154 shown in FIG. 11. Lead lines or connectors 140 may be deposited for routing electronic data signals from a telemetry transmitter circuit to rotating antenna assembly 142.

Figure 11:
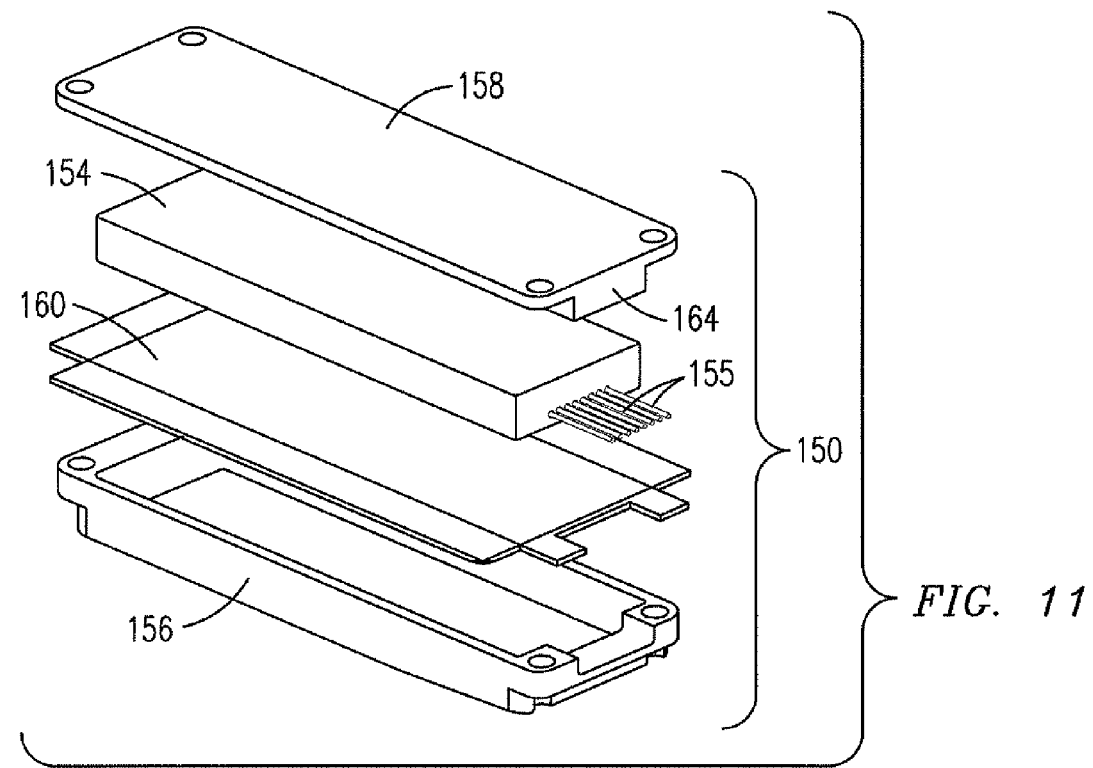
FIG. 11 is an exploded view of an exemplary embodiment of the telemetry transmitter housing of FIG. 10.

FIG. 11 illustrates a high temperature electronics package 154 that may contain a high temperature circuit board and form part of telemetry transmitter assembly 150. The main body of electronics package 154 may be fabricated from alloys such as Kovar, an alloy of Fe—Ni—Co. The thermal expansion coefficient of kovar ranges from about $4.5$-$6.5 \times 10^{-6}/°$ C., depending on exact composition. The Ni-based alloys typically used for high temperature turbine components, such as turbine blade 130 have thermal expansion coefficients in the range of about $15.9$-$16.4 \times 10^{-6}/°$ C. Electronics package 154 may be affixed securely in place while allowing for relative movement between electronics package 154 and turbine blade 130. This relative movement may result from their different thermal expansion rates, which occur over time during the high number of thermal cycles between ambient air temperature and the >450° C. operating temperature typically experienced proximate blade root 132.

The telemetry transmitter assembly 150, as best shown in FIG. 11, may include a mounting bracket 156 and a lid or cover plate 158 with electronics package 154 positioned there between. A plurality of connecting pins 155 enable connection between an electronic circuit board contained within package 154, such as one having a wireless telemetry circuit fabricated thereon, and various external devices such as lead lines from sensors, induction coil assemblies and/or data transmission antennae. Mounting bracket 156, cover plate 158 and retention screws 159 connecting them together may all be fabricated from the same material as is turbine blade 130. This ensures there is no difference in thermal expansion between turbine blade 130 and mounting bracket 156. Consequently, no stresses are generated in mounting bracket 156 and/or turbine blade 130 during thermal transients.

The thermal expansion coefficient of electronics package 154 may be less than that of mounting bracket 156 when the operating system within which these components reside is at a high temperature. Consequently, electronics package 154, including any circuit board contained therein, would expand less than mounting bracket 156, which may lead to damage caused by vibrational energy in the system. In order to secure electronics package 154 within mounting bracket 156 to accommodate the dimensional change differential between bracket 156 and electronics package 154, a layer of ceramic fiber woven fabric 160 may be placed between the electronic package 154 and the inside surface of mounting bracket 156. Fabric 160 may be fabricated from suitable ceramic fiber, including such fibers as silicon carbide, silicon nitride or aluminum oxide. For example, a quantity of Nextel™ aluminum oxide based fabric, manufactured by 3M, may be used for fabric 160.

With electronics package 154 and ceramic fiber woven fabric 160 assembled with mounting bracket 156 and cover plate 158 to form telemetry transmitter assembly 150, mounting bracket 156 may be attached to turbine blade 130 by a suitable means for attaching such as bolting, welding, brazing or via transient liquid phase bonding. FIG. 10 illustrates a recess or flat pocket 162 that may be milled or otherwise formed within turbine blade 130 proximate blade root 132 for receiving assembly 150.

Cover plate 158 may be formed with a flange 164 oriented perpendicular to the direction of G-forces, to add structural support to the cover plate, which counters the G-load forces occurring when rotating turbine blade 130 is operating at full speed. This relieves retention screws 159 from carry the load applied to cover plate 158 via G-forces, and allows them to be made sufficiently small so that the telemetry transmitter assembly 150 fits in the relatively small recess 162 with no interference with any adjacent components. If retention screws 159 were required to carry the load applied by the G-forces, their required size would be too large to fit in the available space.

FIG. 10 shows that rotating antenna assembly 142 may be affixed to the end face or neck of root 132. Assembly 142 may be an electronic assembly having thermal expansion coefficients different than those of the Ni-based alloys used for turbine hot gas path components such as turbine blade 130 including its root 132. One or more rotating antenna assemblies 142 may be protected from windage during rotation of turbine blade 130 at near the speed of sound. In an embodiment, the windage protection material is transparent to RF radiation frequencies in order to enable transmission of power and data through the material.

Figure 12:
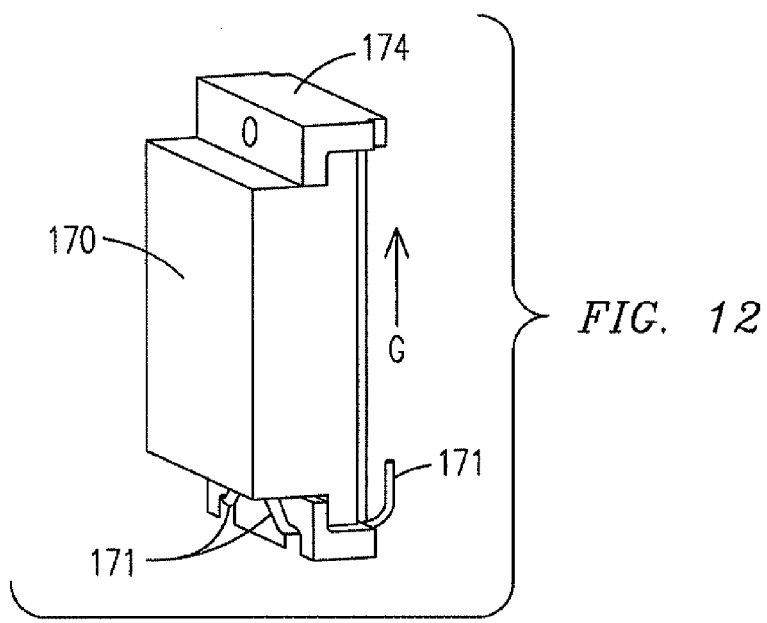
FIG. 12 illustrates components of an exemplary rotating antenna assembly.

Embodiments of rotatable antenna assembly 142 may include a durable, protective, RF transparent cover 170 shown in FIGS. 10 and 12, which is essentially a hollow fixture within which a data antenna and induction power components are contained. RF transparent cover 170 protects its contents from windage and hot gas ingress during operation of combustion turbine 10. Certain ceramics are suitable for protecting RF transmission equipment from the elements at elevated temperatures. However, many ceramics and ceramic matrix composites are prone to chipping and cracking under the vibrational, impact and G-loading that a rotating turbine blade 130 experiences during operation of combustion turbine 10.

The inventors of the present invention have determined that RF transparent cover 170 may be fabricated from an RF transparent, high toughness, structural ceramic materials. Ceramic matrix composites may be used to fabricate housing 170 as well as material selected from a family of materials known as toughened ceramics. Materials such as silicon carbide, silicon nitride, zirconia and alumina are available with increased toughness due to doping with additional elements and/or designed microstructures resulting from specific processing approaches.

One such material that is RF transparent, easy to form, and relatively inexpensive is a material selected from a ceramic family generally referred to as zirconia-toughened alumina (ZTA). Ceramic material selected from this family of aluminum oxide materials is considerably higher in strength and toughness than conventional pure aluminum oxide materials. This results from the stress-induced transformation toughening achieved by incorporating fine zirconium oxide particles uniformly throughout the aluminum oxide. Typical zirconium oxide content is between 10% and 20%. As a result, ZTA offers increased component life and performance relative to conventional pure aluminum oxide materials.

The designed microstructure of ZTA is fracture-resistant when the ceramic is loaded in compression. However, if loaded sufficiently in tension, the ceramic will fail catastrophically, as with traditional ceramic materials. Consequently, RF transparent cover 170 is designed so that the tensile stresses in the ceramic material are minimized during operation of combustion turbine 10. This is accomplished by designing and fabricating such that (1) all corners, edges and bends of the ZTA components are machined to eliminate sharp corners and edges, in order to reduce the stress concentration factor at these locations, and (2) the orientation and fit of the ZTA component in a rotating antennae mounting bracket 174 is such that during operation the G-forces applied to the ZTA box do not generate significant bending stresses in the attachment flanges. This is accomplished by orienting the flanges parallel with the G-loading direction, rather than perpendicular to the G-loading direction, so the ZTA flange is loaded in compression and not in bending.

FIG. 12 illustrates that a rotating antennae mounting bracket 174 may be assembled with RF transparent cover 170 to form rotating antenna assembly 142, as shown affixed to turbine blade 130 in FIG. 10. The interface loading between the rotating antennae mounting bracket 174 and the RF transparent cover 170 minimizes the tensile stresses that occur in RF transparent cover 170. The design is such that the tensile stresses that occur in the RF transparent cover 170 are less than the minimum stress for fracture, resulting in long life for the structural component. Mounting bracket 174 may be made of the same metal as turbine blade 130 because the uniform thermal expansion coefficient between them will result in minimal stresses being generated in the attachment region during heat-up and cool-down cycles.

Mounting bracket 174 may be designed so that all the G-loading experienced by rotating antenna assembly 142 during operation of combustion turbine 10 is absorbed in a direction extending toward upper end 178 of bracket 174, as indicated by arrow G in FIG. 12. No portion of mounting bracket 174 extends far enough past an antenna contained therein to attenuate the RF transmission data signal. RF transparent cover 170 is secured in place so its internal stress field is primarily compressive and may be retained using threaded pins (not shown) through semicircular divots on its flanges.

Mounting bracket 174 may be attached to a face of turbine blade root 132 via conventional means such as welding, brazing, bonding, bolting or screwing. An embodiment of rotating antenna assembly 142 may be assembled by placing desired antennae into the hollow body of RF transparent cover 170, feeding lead wires 171 from the antennae out through holes formed within cover 170 and then filling the hollow body of cover 170 containing the antennae with a ceramic potting material. The potted RF transparent cover 170 containing the antennae may then be slid into mounting bracket 174, which may have been previously affixed to turbine blade root 132. Cover 170 may be secured to mounting bracket 174 via pins inserted in holes in mounting bracket 174 and divots in cover 170.

Embodiments of the present invention may be powered by various means such as induced RF energy and/or by harvesting thermal or vibrational power within the combustion turbine engine 16. In the energy harvested power model, either thermoelectric or vibro-electric power could be generated from the energy available in an operating combustion turbine engine 16. Thermopiles may be used to generate electricity from thermal energy, or piezoelectric materials may generate electricity from vibration of combustion turbine engine 16. Examples of these forms of power sources are described in the patent application having application Ser. No. 11/516,338 filed Sep. 6, 2006, the entire disclosure of which is incorporated herein by reference.

Figure 13:
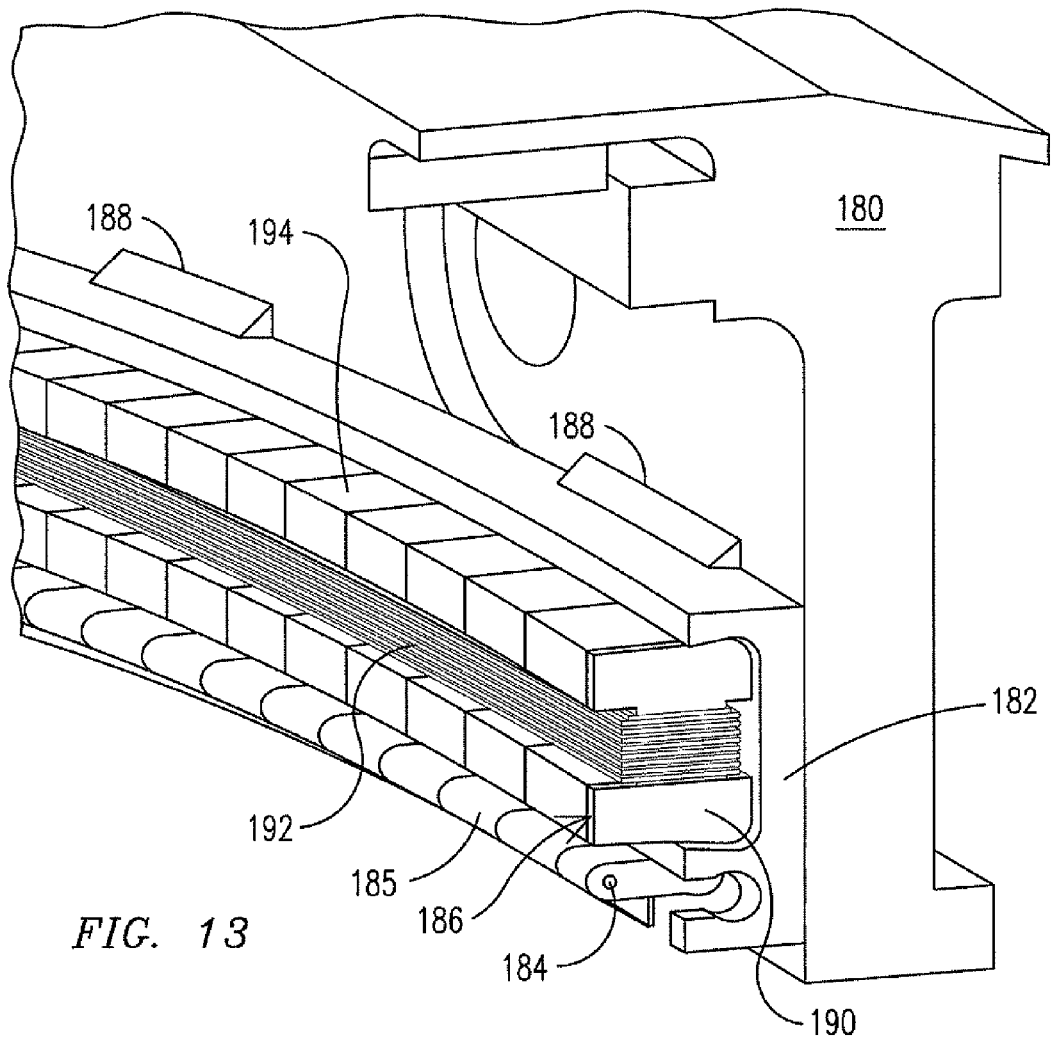
FIG. 13 is a partial perspective view on a turbine static seal having an exemplary embodiment of a stationary antenna assembly mounted thereto.

Embodiments of the present invention provide induced power modes for powering components of wireless high temperature telemetry systems. Such systems may be configured as air-gap transformers where the transformer primary induction coil assembly 186 is stationary and the secondary induction coil assembly 195 rotates. For example, an induced RF power configuration is provided for powering a rotating telemetry transmitter contained within telemetry transmitter assembly 150. FIG. 13 illustrates a portion of a static seal segment 180 such as one that may be used within the turbine engine 16 of combustion turbine 10. A plurality of static seal segments 180 may encircle turbine engine 16 adjacent to a plurality of turbine blades 130. Static seal segments 180 may cooperate with turbine blades 130 for sealing hot gas within a hot gas path through turbine engine 16 as recognized by those skilled in the art.

FIG. 13 shows an arcuate bracket 182 having respective channels or grooves formed therein within which a stationary data transmission antenna 184 and a stationary primary induction coil assembly 186 may be secured. Data transmission antenna 184 may be inserted into a non-conducting holder 185 for securing data transmission antenna 184 with bracket 182. Non-conducting holder 185 ensures that data transmission antenna 184 does not contact bracket 182, which may be fabricated of metal, thereby ensuring correct operation. Non-conducting holder 185 may be fabricated from the same ZTA toughened ceramic material used for the RF transparent cover 170. In the case of employing the antenna 184 in an arcuate bracket 182, such as shown in FIG. 13, holder 185 may be segmented to provide flexibility, which allows for installation in curved bracket 182. The same segmented configuration may be applied to the induction coil assembly 186 to enable installation in a curved bracket 182.

Primary induction coil assembly 186 and data transmission antenna holder 185 may be formed with lobes in the region of attachment to bracket 182. The associated regions of material in the bracket 182 are removed in the same lobe shape, with slightly larger size to accommodate installation. The lobe shape defines a radius of curvature that enables positive retention of induction coil assembly 186 and antenna and holder 184, 185, which may be placed into bracket 182 from an end and slid into position. The lobe shape enables positive retention to be maintained while simultaneously ensuring that tensile stresses are not generated in induction coil assembly 186 and antenna holder 185, both of which may be fabricated of relatively brittle materials subject to structural failure under tensile stresses.

The lobes may be positioned far enough from the front of induction coil assembly 186 and data transmission antenna 184 to ensure that metal bracket 182 does not interfere with functionality. Ceramic cement may be applied between the surfaces of induction coil assembly 186 and antenna holder 185, and their respective pockets in bracket 182, in order to provide a secure fit and accommodate thermal expansion differences during heat up and cool down. A thin plate (not shown) may be attached on each end of bracket 182 that covers the lobed regions of the induction coil assembly 186 and the data antenna 184, ensuring retention during operation.

One or more brackets 182 may be fabricated of the same alloy as static seal segment 180, such as Inconel 625, and have an arcuate shape to conform to the interior surface of static seal segment 180. Bracket 182 may be affixed to the interior surface of static seal segment 180 using an interrupted weld 188 to minimize distortion of static seal segment 180. Induction coil assembly 186 may include at least one stationary core 190 and at least one stationary primary winding 192 with 'H Cement' 194 sold by JP Technologies encasing portions of stationary core 190.

Figure 14:
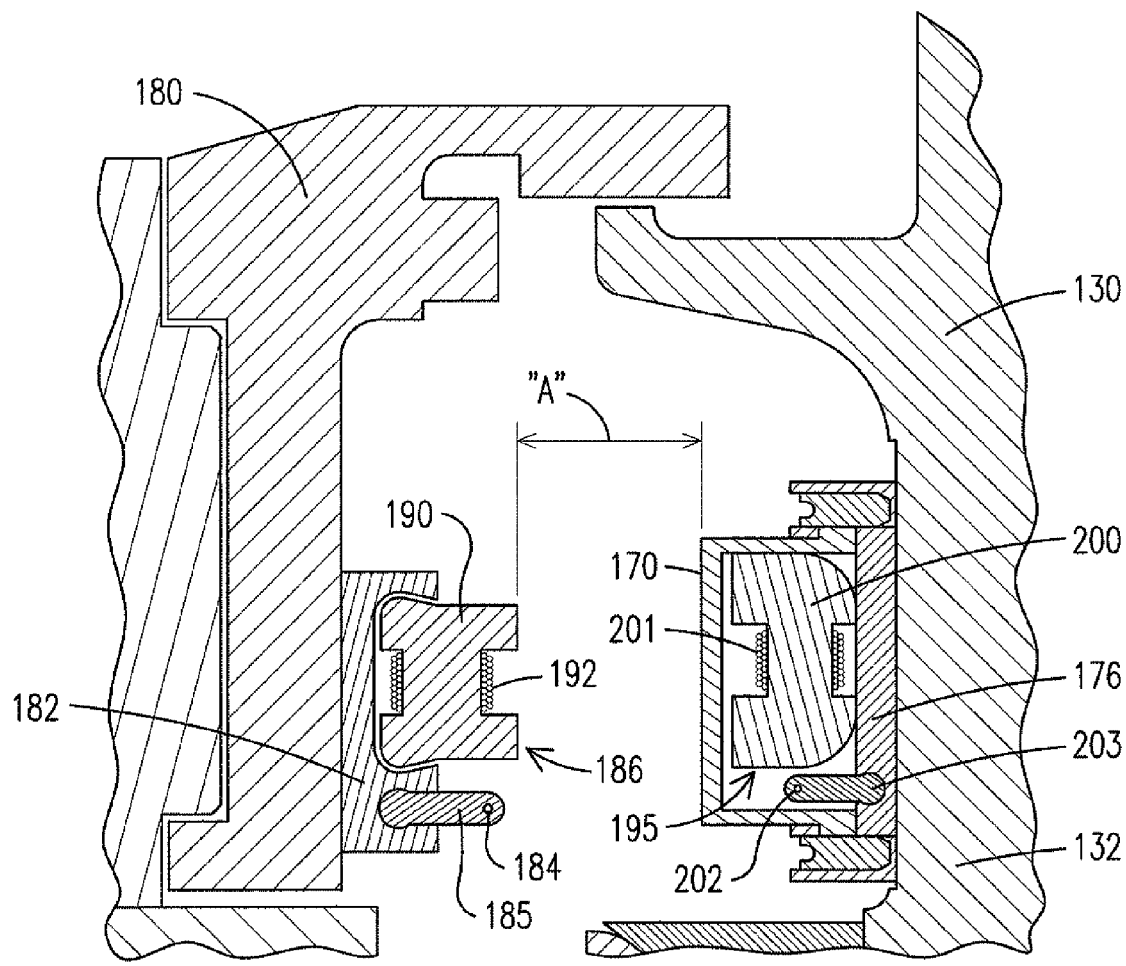
FIG. 14 is a partial cross sectional view of the turbine static seal of FIG. 12 and a turbine blade assembly having an exemplary rotating power and antenna assembly mounted thereto.

FIG. 14 illustrates an embodiment having a rotating secondary induction coil assembly 195 contained within RF transparent cover 170, which may be mounted proximate turbine engine blade root 132. The rotating induction coil assembly 195 may be fabricated from a core 200 and winding 201, similar to the stationary induction coil assembly 186. A rotating data transmission antenna 202 may be provided for communication with stationary data transmission antenna 184. Data transmission antenna 202 may be encased within a non-conducting holder 203, which may be similar in construction as non-conducting holder 185. In an alternate embodiment, data transmission antenna 202 may be contained in RF transparent cover 170, without use of non-conducting holder 203, in which case it may be held in place with a high temperature capable potting material. Single or multiple stationary primary induction coils 186 may be arranged on the interior surface of one or more static seal segments 180 to form an arc that is circumscribed by rotating secondary induction coil assembly 195 and antenna 202 when combustion turbine 10 is in operation.

One or more stationary primary winding 192 may be energized by high frequency, high current power sources. The power can be supplied to each stationary induction coil assembly 186 individually, or a series of stationary induction coil assemblies 186 may be electrically connected and driven by a single power supply. In an exemplary embodiment there may be five adjacent, stationary induction coil assemblies 186 with each driven by its own power supply. The current flowing through each stationary primary winding 192 creates a magnetic field in the rotating secondary induction coil assembly 195 that in turn creates a current in the rotating secondary winding 201. The current from rotating secondary winding 201 supplies power to a wireless telemetry transmitter circuit contained within wireless telemetry transmitter assembly 150 as described more fully herein below.

FIG. 14 illustrates that an initial gap "A" may exist between RF transparent cover 170 and stationary core 190 prior to startup of combustion turbine 10. Initial gap "A" may be about 13 mm at startup of combustion turbine 10 and reduce to about 4 mm at baseload when turbine blade 130 and static seal segment 180 are closer together. Magnetic core materials may be used to fabricate stationary core 190 and rotating core 200. A magnetic material may be used as a core material in order to couple the required power to a telemetry transmitter circuit contained within telemetry transmitter assembly 150 over the required gap "A". The selected magnetic material acts to focus the magnetic field produced by the stationary primary windings 192 and received by one or more rotating secondary windings 201. This effect increases the coupling efficiency between the stationary and rotating elements.

Embodiments of induced power systems disclosed herein may employ multiple individual primary and secondary induction coil assemblies 186, 195 to accommodate various geometries with combustion turbine 10. For instance, stationary induction coil assembly 186 and data transmission primary antenna 184 may need to span a certain distance of static seal segment 180 in order to induce enough power to the system components and transmit the required data. An embodiment of induction coil assembly 186 and data transmission antenna 184 may need to be approximately four feet in length. In this example, for ease of fabrication, four individual power/antenna assemblies each with a length of approximately one foot may be fabricated with respective brackets 182 and installed adjacent to one another on one or more static seal segments 180. If the end-to-end gap distance between the individual antennae is sufficiently small then the antenna assembly will function as if it were a single, four-foot long antenna. Such antenna assemblies may be formed from straight or curved elements thereby providing assemblies of varying lengths that are straight, curved or otherwise configured as required by the specific application. In an embodiment, a plurality of such antenna assemblies may span an arc of approximately 112 degrees in the top half of one or more static seal segments 180 within turbine 16.

The inventors of the present invention have determined that a particular class of magnetic core materials meets or exceeds the performance requirements of embodiments of the present invention. The general term for this class of materials is a nanocrystalline iron alloy. One composition of this class of material is sold under the trade name NAMGLASS® and has a composition of approximately 82% iron—with the balance being silicon, niobium, boron, copper, carbon, nickel and molybdenum. It has been determined that such nanocrystalline iron alloy material exhibits desirable characteristics such as a Curie temperature greater than 500° C., very low coercivity, low eddy-current loss, high saturation flux density and the permeability is very stable over the entire high temperature operating range.

This nanocrystalline iron alloy material is commercially available in tape-wound configurations in the form of toroids, or "C" core transformer cores. Embodiments of the present invention utilize this nanocrystalline iron alloy material to form an "I" core shape, which was used for the primary stationary core 190. The "I" shape was selected because this shape holds itself in place in the channel on stationary mounting bracket 182. The induction core 190 of each induction coil assembly 186 consists of a plurality of 0.007" thick laminations of nanocrystalline iron alloy material built up into an arc of approximately eleven inches in length. The same nanocrystalline iron alloy material may be used for the rotating antenna 200 transformer core.

Figure 16:
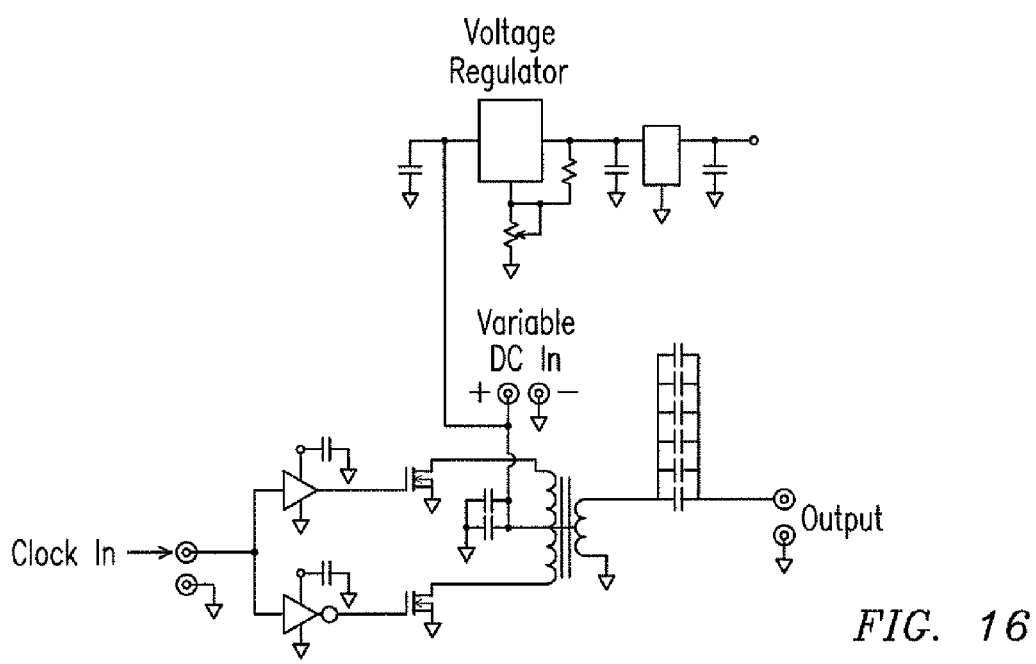
FIG. 16 is a schematic of an exemplary induction power driver circuit.

The strength of the magnetic field used to couple power between the stationary and rotating elements may be increased by increasing the frequency of the driving signal, i.e. the high frequency AC signal produced by an exemplary induction power driver circuit illustrated in FIG. 16. Thus, embodiments of the present invention may employ a high frequency to drive the stationary primary windings 192, such as frequencies greater than approximately 200 kHz. Alternate embodiments may achieve an operating frequency of at least one Mega-Hertz with a power driver designed to operate at such frequencies.

The wire used for winding cores 190, 200 may be made of a 27% nickel-clad copper with ceramic insulation in order to reduce oxidation and failure at high temperatures. The handling characteristics of this wire are significantly more challenging than standard organic-insulated bare copper, as a result of the protective, ceramic coating, and special techniques were developed for the processes of winding both the primary and rotating elements. Other wires may be insulated silver or anodized aluminum.

Two types of ceramic materials may be used in the construction of both the primary and rotating induction coil assemblies 186, 195. It is important to ensure the windings 192, 201 do not short (conduct) to the core elements 190, 200. In addition to ceramic insulation supplied on the wires, a compound, such as H cement, a ceramic cement with ultra fine particle size, may be used as an insulating base coat on the winding cores 190, 200. Once the winding cores 190, 200 are wound they may be potted with Cotronics 940, an aluminum oxide based ceramic cement.

Figure 15:
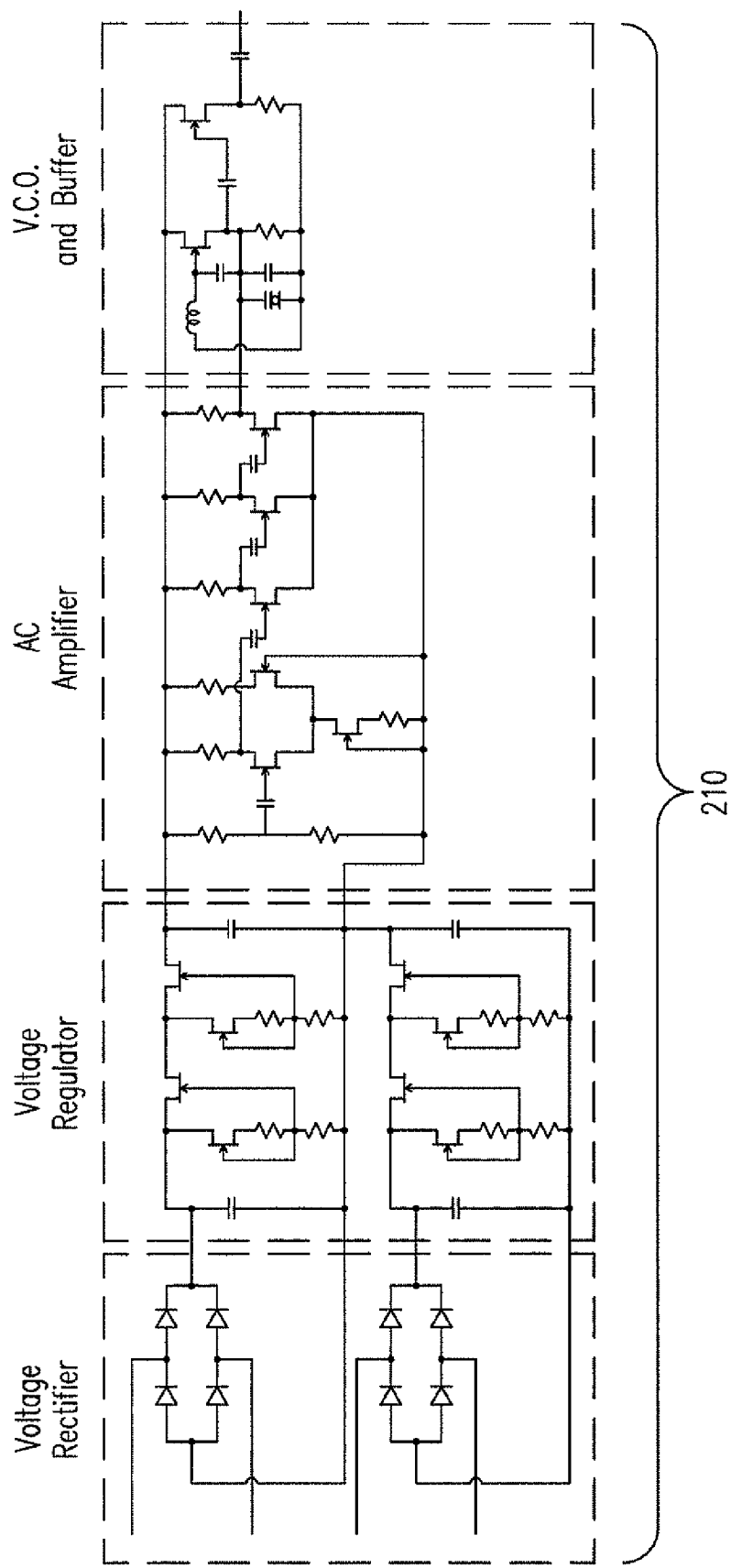
FIG. 15 is a block diagram of an exemplary telemetry transmitter circuit.

FIG. 15 illustrates a schematic of an exemplary telemetry transmitter circuit 210 that may be fabricated on a circuit board fitted inside high temperature electronics package 154 shown in FIG. 11, which is contained within telemetry transmitter assembly 150 shown in FIG. 10. Telemetry transmitter circuit 210 may be configured for operation with a sensor such as sensor 134 of FIG. 9, which may be a strain gauge sensor for measuring strain associated with turbine blade 130. The rotating secondary induction coil assembly 195 may provide approximately 250 kHz AC power to the voltage rectifier of transmitter circuit 210. This circuit changes the AC input to a DC output and feeds the voltage regulator circuit.

The voltage regulator of transmitter circuit 210 maintains a constant DC voltage output, even though the AC input voltage may vary. A constant voltage output is required to achieve better accuracy and stable operating frequency for the signal output. The voltage regulator also supplies a constant voltage a strain gauge sensor 134 and a ballast resistor (not shown). The strain gauge sensor 134 and ballast resistor provide the sensor signal input to the transmitter circuit 210. As the surface where the strain gauge sensor 134 is mounted deflects, the strain gauge changes resistance, which causes the voltage at the transmitter circuit 210 input to change.

The varying voltage provided by the signal from the strain gauge sensor 134 is amplified first by a differential amplifier and then by a high gain AC amplifier. The resulting signal is applied to a varactor diode in the voltage controlled oscillator (VCO) section of transmitter circuit 210. The VCO oscillates at a high carrier frequency. This carrier frequency may be set in the band of 125 to 155 MHz with respect to transmitter circuit 210. The fixed carrier frequency is changed slightly by the changing voltage on the varactor. This change in frequency or deviation is directly related to the deflection or strain undergone by strain gauge sensor 134. The VCO carrier output is fed to a buffer stage and the buffer output connects to a transmitting antenna contained in the rotating antenna assembly 142 via lead wires 140 of FIG. 10.

In a receiving device, such as transceiver 56 in FIG. 1 or other devices located in high temperature or other areas within combustion turbine 10, the carrier signal is removed and the deviation becomes the amplified output that is proportional to strain. The transistors used in such a transmitter circuit 210 designed for high temperature use may be fabricated from a high temperature capable material, such as wide band gap semiconductor materials including SiC, AlN, GaN, AlGaN, GaAs, GaP, InP, AlGaAs, AlGaP, AlInGaP, and GaAsAlN, or other high temperature capable transistor material may be used up to about 500-600° C.

Various embodiments of wireless telemetry transmitter circuit 210 fabricated on a circuit board may be adapted for use within combustion turbine 10 at varying operating temperatures and with a range of sensor types. Elements of transmitter circuit 210 and alternate embodiments thereof may be fabricated using various temperature sensitive materials such as silicon-on-insulator (SOI) integrated circuits up to approximately 350° C.; polysilseqioxane, PFA, polyimide, Nomex, PBZT, PBO, PBI, and Voltex wound capacitors from approximately 300-350° C.; and PLZT, NPO, $Ta_2O_5$, $BaTiO_3$ multi-layer ceramic capacitors from approximately 450-500° C.

Various embodiments of resistors may be fabricated of Ta, TaN, Ti, $SnO_2$, Ni—Cr, Cr—Si and Pd—Ag for operating environments of approximately up to 350° C. and Ru, $RuO_2$, Ru—Ag and $Si_3N_4$ for operating environments of approximately 350° C. and greater. Individual high temperature electronic components, such as discrete transistor, diode or capacitor die made from SiC, AlN, GaN, AlGaN, GaAs, GaP, InP, AlGaAs, AlGaP, AlInGaP, and GaAsAlN, or other high temperature capable semiconducting material, may be replaced by a single SOI CMOS device for operation at temperatures not exceeding approximately 350° C.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A telemetry system for use in a combustion turbine engine having a compressor, a combustor and a turbine, the telemetry system comprising:
    a sensor in connection with a turbine blade;
    a telemetry transmitter circuit affixed to the turbine blade;
    a first connecting material deposited on the turbine blade for routing electronic data signals from the sensor to the telemetry transmitter circuit, the electronic data signals indicative of a condition of the turbine blade;
    an induction power system for powering the telemetry transmitter circuit;
    a rotating data antenna affixed to an end face of a root of the turbine blade;
    a second connecting material deposited on the turbine blade for routing electronic data signals from the telemetry transmitter circuit to the rotating data antenna;
    a stationary data antenna affixed to a static seal segment adjacent the turbine blade,
    wherein the telemetry transmitter circuit is contained within a telemetry transmitter assembly comprising:
    a mounting bracket having a first thermal expansion coefficient that is substantially the same as a thermal expansion coefficient of the turbine blade;
    an electronics package having a second thermal expansion coefficient different from the first thermal expansion coefficient, the telemetry transmitter circuit contained within the electronics package;
    retention screws to affix a cover plate to the telemetry transmitter assembly, the cover plate having a flange arranged to relieve the retention screws from solely carrying G-forces exerted on the cover plate when the turbine blade rotates; and
    a planar layer of ceramic fiber woven fabric disposed between the electronics package and an inside surface of the mounting bracket to accommodate a dimensional change differential that can occur between the electronics package and the mounting bracket due to the different first and second thermal expansion coefficients.

2. The telemetry system of claim 1 wherein the telemetry transmitter assembly is affixed within a recess formed proximate a root of the turbine blade.

3. The telemetry system of claim 1 further comprising the telemetry transmitter circuit configured with electronic circuitry for processing the electronic data signals from a strain gauge sensor deposited on a surface of the turbine blade, the telemetry transmitter circuit capable of operating within an environment of at least about 450° C.

4. The telemetry system of claim 1 further comprising the telemetry transmitter circuit configured with electronic circuitry for processing the electronic data signals, the electronic circuitry including at least one transistor made of a material selected from the group of SiC, AlN, GaN, AlGaN, GaAs, GaP, InP, AlGaAs, AlGaP, AlInGaP, and GaAsAlN.

5. The telemetry system of claim 1 further comprising the telemetry transmitter circuit configured with electronic circuitry for processing the electronic data signals, the electronic circuitry including at least one capacitor made of a material selected from the group of PLZT, NPO, $Ta_2O_5$ and $BaTiO_3$.

6. The telemetry system of claim 1 further comprising the telemetry transmitter circuit configured with electronic circuitry for processing the electronic data signals, the electronic circuitry including at least one resistor made of a material selected from the group of Ru, $RuO_2$, Ru—Ag and $Si_3N_4$.

7. The telemetry system of claim 1 further comprising an RF transparent cover affixed to an end face of a root of the turbine blade wherein the rotating data antenna is contained within the RF transparent cover.

8. The telemetry system of claim 7 further comprising the RF transparent cover made of a zirconia-toughened alumina.

9. The telemetry system of claim 8 further comprising a mounting bracket having top and bottom flanges assembled with the RF transparent cover wherein the mounting bracket is attached to the end face of the turbine blade root so that the top and bottom flanges are oriented parallel with a G-loading direction during operation of the combustion turbine.

10. The telemetry system of claim 7 further comprising a mounting bracket having top and bottom flanges assembled with the RF transparent cover, the mounting bracket made of a material having a thermal expansion coefficient that is substantially the same as a thermal expansion coefficient of the end face of the turbine blade root.

11. The telemetry system of claim 1 further comprising the induction power system comprising:
   a stationary primary induction coil assembly affixed to the static seal segment adjacent to the turbine blade;
   a rotating secondary induction coil assembly electromagnetically coupled through an air gap to the stationary primary induction coil assembly and affixed to the end face of the turbine blade root; and
   a power source energizing the stationary primary induction coil assembly so that the rotating secondary induction coil assembly operates at a frequency of between approximately 250 kHz to 1 MHz.

12. The telemetry system of claim 11 further comprising the stationary primary induction coil assembly and the rotating secondary induction coil assembly each having a core made of a magnetic nanocrystalline iron alloy.

13. The telemetry system of claim 12 further comprising the respective cores of the stationary primary induction coil assembly and the rotating secondary induction coil assembly being wound with a wire selected from the group of a 27% nickel-clad copper wire encased within a ceramic insulation, an insulated silver wire and an anodized aluminum wire.

14. The telemetry system of claim 11 further comprising:
   the stationary primary induction coil assembly including a stationary core made of a magnetic nanocrystalline iron alloy fabricated in an "I" configuration and wound with a 27% nickel-clad copper wire encased within a ceramic insulation;
   the rotating secondary induction coil assembly including a rotating core made of the magnetic nanocrystalline iron alloy fabricated in a "C" configuration and wound with the 27% nickel-clad copper wire encased within the ceramic insulation; and
   the power source energizing the stationary primary induction coil assembly so that the rotating secondary induction coil assembly operates at a frequency of approximately 250 kHz across a gap of approximately 13 mm between the stationary primary induction coil assembly and the rotating secondary induction coil assembly at start up of the combustion turbine engine.

15. The telemetry system of claim 11 further comprising:
   a telemetry transmitter assembly affixed within a recess formed proximate the turbine blade root, the telemetry transmitter circuit contained within the telemetry transmitter assembly;
   a mounting bracket having top and bottom flanges assembled with an RF transparent cover, the mounting bracket attached to the end face of the turbine blade root and covering the rotating secondary induction coil assembly;
   a first antenna holder made of a zirconia-toughened alumina having a lobed shaped proximal end affixed within an interior wall of the mounting bracket, the rotating data antenna secured within a distal end of the first antenna holder;
   an arcuate bracket having a first lobe shaped recess and a second lobe shaped recess, each recess sized for receiving a respective one of the stationary primary induction coil assembly and the stationary data antenna, the arcuate bracket affixed to the static seal segment; and
   a second antenna holder made of a zirconia-toughened alumina having a lobed shaped proximal end affixed within the second lobe shaped recess, the stationary data antenna secured within a distal end of the second antenna holder.

16. The telemetry system of claim 1 further comprising the induction power system comprising:
   a plurality of stationary primary induction coil assemblies affixed to at least one static seal assembly to form a continuous arc spanning approximately 112 degrees; and
   each of the plurality of stationary induction coil assemblies having a core made of a magnetic nanocrystalline iron alloy wound with a 27% nickel-clad copper wire encased within a ceramic insulation.

17. A telemetry system comprising:
   a telemetry transmitter assembly affixed to a component within a combustion turbine engine at a location having an operating temperature of approximately 450° C.;
   a telemetry transmitter circuit contained within the telemetry transmitter assembly, the telemetry transmitter circuit configured to process electronic data signals indicative of a condition of the component;
   an antenna assembly affixed to the component at a location having an operating temperature of approximately 450° C.;
   a data transmission antenna contained within the antenna assembly, the data transmission antenna receiving electronic data signals from the telemetry transmitter circuit indicative of the condition of the component; and
   an induction power system configured for powering the telemetry transmitter circuit, the induction power system operating within the combustion turbine engine at a location having an operating temperature of approximately 450° C., the induction power system comprising at least one stationary primary induction coil assembly affixed to the static seal segment adjacent to the turbine blade;
   a rotating secondary induction coil assembly electromagnetically coupled through an air gap to said at least one stationary primary induction coil assembly and affixed to the end face of the turbine blade root; and
   a power source energizing the stationary primary induction coil assembly so that the rotating secondary induction coil assembly operates at a frequency of between approximately 250 kHz to 1 MHz.

18. The telemetry system of claim 17 further comprising:
   at least one sensor to sense a condition of a component within a combustion turbine engine; and
   a connecting material deposited on the component for routing electronic data signals indicative of the condition of the component from the means for sensing to the telemetry transmitter circuit.

19. A telemetry system for use within a combustion turbine engine, the telemetry system comprising:
   a telemetry transmitter circuit board affixed proximate a turbine blade root and having electronic circuitry configured for receiving electronic data signals from a sensor and transmitting electronic data signals indicative of a condition of a component within the combustion turbine engine;
   a first data antenna affixed to an end face of the turbine blade root and configured for receiving the electronic data signals transmitted from the telemetry transmitter circuit board;

a second data antenna affixed to a static seal segment adjacent to the first data antenna and configured for receiving electronic data signals transmitted from the first data antenna;

at least one primary induction coil assembly affixed to the static seal segment and having a core made of a magnetic nanocrystalline iron alloy;

a secondary induction coil assembly electromagnetically coupled through an air gap to said at least one primary induction coil assembly, the secondary induction coil assembly affixed to the end face of the turbine blade root and having a core made of the magnetic nanocrystalline iron alloy; and wherein the at least one primary induction coil assembly is energized at approximately 250 kHz so that the secondary induction coil assembly has an operating frequency of approximately 250 kHz and provides power to the telemetry transmitter circuit board.

* * * * *

UNITED STATES PATENT AND TRADEMARK OFFICE
CERTIFICATE OF CORRECTION

PATENT NO. : 8,519,866 B2
APPLICATION NO. : 11/936936
DATED : August 27, 2013
INVENTOR(S) : David J. Mitchell et al.

It is certified that error appears in the above-identified patent and that said Letters Patent is hereby corrected as shown below:

On the title page item 73 should read

Assignees: Siemens Energy, Inc., Orlando, FL (US)
Arkansas Power Electronics International, Inc., Fayetteville, AR (US)

Signed and Sealed this
Ninth Day of August, 2016

Michelle K. Lee
*Director of the United States Patent and Trademark Office*